(12) United States Patent
Jönsson et al.

(10) Patent No.: US 9,789,600 B2
(45) Date of Patent: Oct. 17, 2017

(54) SPACER FOR SPACING A TOOL FROM A TOOL STAND

(71) Applicant: Husqvarna AB, Huskvarna (SE)

(72) Inventors: Andreas Jönsson, Hallsberg (SE); Lars Freidlitz, Västra Frölunda (SE); David Grennhag, Göteborg (SE); Jakob Thordsson, Göteborg (SE)

(73) Assignee: HUSQVARNA AB, Huskvama (SE)

( * ) Notice: Subject to any disclaimer, the term of this patent is extended or adjusted under 35 U.S.C. 154(b) by 14 days.

(21) Appl. No.: 14/439,740

(22) PCT Filed: Oct. 31, 2012

(86) PCT No.: PCT/SE2012/051186
§ 371 (c)(1),
(2) Date: Apr. 30, 2015

(87) PCT Pub. No.: WO2014/070054
PCT Pub. Date: May 8, 2014

(65) Prior Publication Data
US 2015/0290793 A1    Oct. 15, 2015

(51) Int. Cl.
*B23B 45/00* (2006.01)
*B23B 47/00* (2006.01)
(Continued)

(52) U.S. Cl.
CPC ............ *B25H 1/0042* (2013.01); *B23B 47/00* (2013.01); *B28D 7/00* (2013.01); *F16M 11/04* (2013.01); *B23B 45/00* (2013.01); *B23B 2240/36* (2013.01)

(58) Field of Classification Search
CPC ....... B23B 47/00; B23B 45/00; B25H 1/0021; B25H 1/0042; B23Q 3/02; B23Q 1/28; Y10T 403/7094
See application file for complete search history.

(56) References Cited

U.S. PATENT DOCUMENTS 3,285,134 A * 11/1966 Kehr .................... B23F 19/105
                                                        29/33 J
3,412,813 A * 11/1968 Johnson ................. E21B 7/027
                                                        173/141
(Continued)

FOREIGN PATENT DOCUMENTS

CN    101610880 A    12/2009
CN    201366524 Y    12/2009
(Continued)

OTHER PUBLICATIONS

International Search Report and Written Opinion in the International patent application No. PCT/SE2012/051186 mailed Jun. 26, 2013, all enclosed pages cited.

(Continued)

*Primary Examiner* — Sunil K Singh
*Assistant Examiner* — Ryan Rufo
(74) *Attorney, Agent, or Firm* — McNair Law Firm, P.A.

(57) ABSTRACT

A spacer (1) for spacing a tool such as a drill motor from a tool stand such as a drill stand, the spacer (1) comprising a spacer body (2) and a locking member (3), the spacer body (2) having first (4) and second (5) opposing faces, the locking member (3) extending from a first end (6) thereof adjacent to the first face (4) to a second end (7) thereof adjacent to the second face (5), the locking member (3) being able to slide relative to the spacer body(2) along a direction from the first end (6) to the second end (7), the first end (6) and the second end (7) each being provided with at least one locking surface(10, 11), wherein the spacer (1) is arranged such that at application of a locking force each locking surface (10, 11) of one of the first and second ends (6, 7) transmits the locking force to each locking surface (10,11) of the other of the first and second ends (6, 7).

8 Claims, 4 Drawing Sheets

(51) Int. Cl.
*B25H 1/00* (2006.01)
*B28D 7/00* (2006.01)
*F16M 11/04* (2006.01)

(56) References Cited

U.S. PATENT DOCUMENTS

| | | | | | |
|---|---|---|---|---|---|
| 4,300,271 | A | * | 11/1981 | Wohlhaupter | B23Q 1/28 384/59 |
| 4,500,235 | A | * | 2/1985 | Johnsen | B28D 1/041 269/43 |
| 4,540,149 | A | * | 9/1985 | Rupprecht | B23Q 1/0063 248/669 |
| 4,582,105 | A | * | 4/1986 | Wolff | B23Q 1/28 144/106 |
| 5,302,045 | A | * | 4/1994 | Johnsen | B25B 5/08 403/17 |
| 5,551,795 | A | * | 9/1996 | Engibarov | B23Q 1/28 269/73 |
| 5,769,577 | A | * | 6/1998 | Boddy | B23B 29/046 408/197 |
| 7,373,710 | B2 | | 5/2008 | Elsworthy | |
| 2005/0267600 | A1 | * | 12/2005 | Haberman | A61F 2/76 623/38 |
| 2011/0064531 | A1 | | 3/2011 | Osborne | |
| 2013/0047486 | A1 | * | 2/2013 | Ding | F41G 11/003 42/124 |
| 2014/0314507 | A1 | * | 10/2014 | Timmons | B25H 1/0071 408/76 |

FOREIGN PATENT DOCUMENTS

| | | | |
|---|---|---|---|
| DE | 9204693 | U1 | 6/1992 |
| DE | 102004039529 | A1 * | 2/2006 ............... B23Q 3/02 |
| EP | 2073958 | B1 | 9/2011 |
| GB | 1235962 | A | 6/1971 |
| JP | S5694211 | U | 7/1981 |
| WO | 8706311 | A1 | 10/1987 |
| WO | 9319915 | A1 | 10/1993 |
| WO | 9606714 | A1 | 3/1996 |
| WO | 2008026974 | A1 | 3/2008 |
| WO | 2008130304 | A1 | 10/2008 |

OTHER PUBLICATIONS

Chapter I International Preliminary Report on Patentability in the International patent application No. PCT/SE2012/051186 issued May 5, 2015, all enclosed pages cited.

* cited by examiner

SPACER FOR SPACING A TOOL FROM A TOOL STAND

TECHNICAL FIELD

This invention relates to a spacer for spacing a tool from a tool stand, such as spacing a drill, or drill motor, from a tool stand or drill stand.

BACKGROUND OF THE INVENTION

It is known to provide stands to support tools. In particular, it is known to provide drill stands to support drills; typically they will support the drill whilst allowing controlled movement in a single direction towards or away from a workpiece, the direction typically being vertical.

In certain situations, depending on the size of the tool and any attachments to the tool for example the drill bit—it can be desired to introduce further space between the tool and the tool stand. In the prior art, this was achieved by providing a spacer which is clamped to the tool and the tool stand. This requires two separate locking mechanisms and motions for each spacer installed, and so is relatively fiddly to set up.

BRIEF DISCLOSURE OF THE INVENTION

According to a first aspect of the invention, we provide a spacer for spacing a tool from a tool stand, the spacer comprising a spacer body and a locking member, the spacer body having first and second opposing faces, the locking member extending from a first end thereof adjacent to the first face to a second end thereof adjacent to the second face, the locking member being able to slide relative to the spacer body along a direction from the first end to the second end, the first end and the second end each being provided with at least one locking surface, wherein the spacer is arranged such that application of a locking force each locking surface of one of the first and second ends transmits the locking force to each locking surface of the other of the first and second ends.

As such, by transmitting the locking force from one face to the other, the act of locking one end by applying a locking force thereto can enable that locking force to lock the other end of the spacer. Thus, the number or complexity of locking mechanisms can be reduced.

The locking surfaces may be elongate so as to have a length in a direction non-parallel to the direction from the first end to the second end. The first and second ends may be complementary, such that the first end of one spacer can receive or be received within the second end of another spacer by running over one another along their lengths. Typically, this can mean that the spacers can be stacked, so that extra separation can be achieved. In such a case, the locking force can be transmitted from the first end of one spacer to the second end of another (or vice versa).

The first and second ends may each have at least one corresponding tab nose and recess along their lengths, such that as the first and second ends are run over one another along their lengths, each corresponding tab nose and recess will engage one another at a given relative position of the locking surfaces. This allows the correct relative position of the spacers, or the spacer and the tool or the tool stand, to be determined and the appropriate integers held at that place.

The spacer may comprise at least one biasing member, such as a spring, which acts to bias the locking member relative to the spacer body so as to bias the tab noses and recesses into engagement once the relative position is reached. This can improve the engagement of the tab noses and recesses, and make encourage the spacer to be held in a correct positioned before the locking force is applied.

At least one of the first and second ends can be provided with a stop, which prevents movement of the first and seconds ends relative to one another past the stop. This can add further to the likelihood that the spacer will be correctly positioned before the locking force is applied.

According to a second aspect of the invention, there is provided a combination of a tool, a tool stand and a spacer in accordance with the first aspect of the invention, in which the tool stand has a locking surface complementary to each locking surface on the first end of the locking member and the tool has a locking surface complementary to each locking surface on the second end of the locking member.

This therefore allows a locking force applied by the locking surface of one of the tool and the tool stand to be transmitted through the spacer to the locking surface of the other of the tool and the tool stand, again meaning that the locking force applied at one end can be utilised at the other end, thus reducing the complexity of the locking arrangement required. The spacer may be mounted on the tool and the tool with spacer may be mounted on the tool stand, the spacer body spacing the tool from the tool stand.

At least one of the tool and the tool stand may have complementary tabs and/or recesses to match the tab noses or recesses of the first or second end to which their locking surfaces are complementary. This allows the spacer to be correctly positioned relative to the tool or tool stand.

One of the tool and the tool stand may have a locking mechanism arranged to apply a locking force to one of the locking surfaces of the spacer, typically using the locking surface of that tool or tool stand. Typically, only one of the tool and the tool stand may have a locking mechanism arranged to apply a locking force to one of the locking surfaces of the spacer. Thus, only a single locking mechanism is required, and so a single action can possibly be used to lock tool to spacer and spacer to tool stand.

The combination may comprise at least one further spacer according to the first aspect of the invention, in which the spacer and each further spacer are connected together sequentially, with the second end of one spacer engaging the first end of a following spacer, the spacers being mounted on the tool and the tool with spacers being mounted on the tool stand. Thus, increased spacing can be achieved by stacking the spacers sequentially; the locking force applied at one end will still be transmitted to the far end of the stack of spacers.

According to a third aspect of the invention, there is provided a method of spacing a tool from a tool stand, comprising using a spacer in accordance with the first aspect of the invention to space the tool from the tool stand, and then using a locking mechanism on one of the tool and the tool stand to apply a locking force to one of the locking surfaces of the spacer so as to transmit the locking force to the other locking surface of the spacer so as to lock the spacer against the other of the tool and the tool stand.

Typically, the method will not comprise using a locking mechanism on the other of the tool and the tool stand to apply a locking force to the locking surfaces of the spacer.

For any of the above aspects, the tool may be a drill, and the tool stand may be a drill stand. Other tools where this invention could be employed are wall saws, tile saws and masonry saws.

BRIEF DESCRIPTION OF THE DRAWINGS

In the following description of preferred embodiments, reference will be made to the accompanying drawings, in which.

DESCRIPTION OF AN EMBODIMENT

Figure 1:
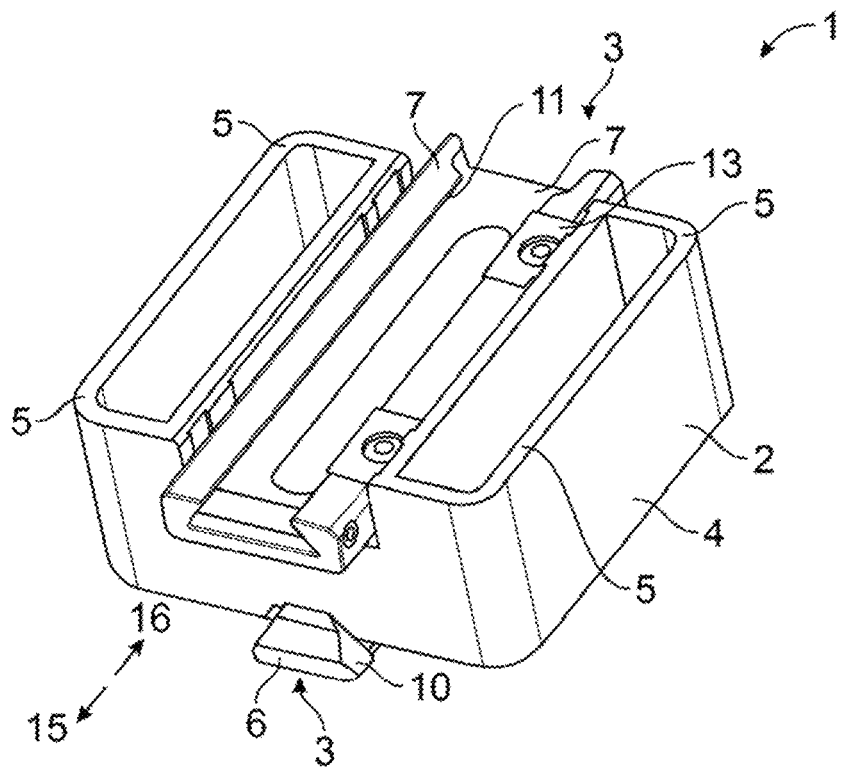
FIG. 1 shows a front perspective view from above of a spacer in accordance with an embodiment of the invention.
Figure 2:
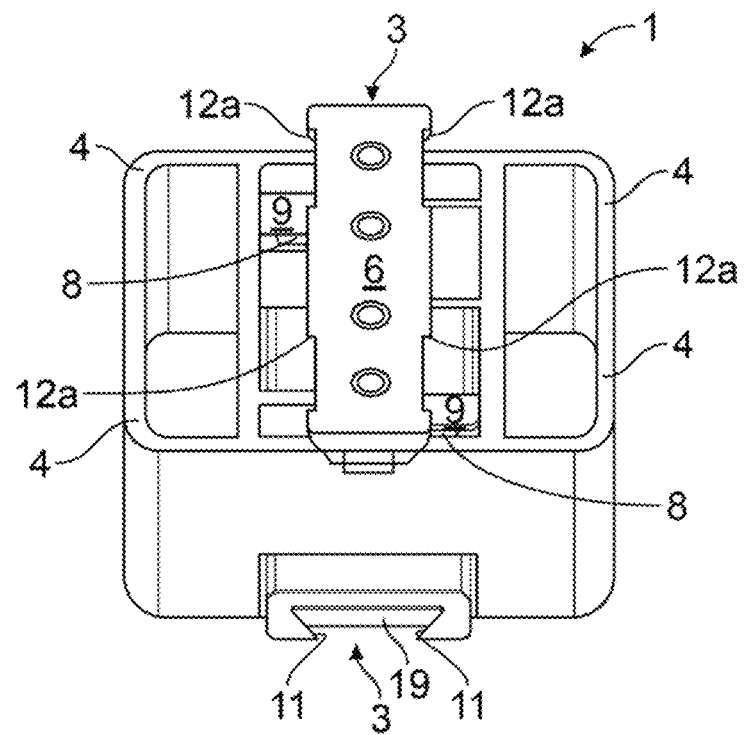
FIG. 2 shows a front perspective view from below of the spacer of FIG. 1.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

A spacer 1 in accordance with an embodiment of the invention is shown in the accompanying drawings. It comprises a body 2 which spaces apart a first face 4 from a second face 5, the first and second faces 4, 5 being parallel to one another.

The body carries a captive locking member 3, which can move relative to the body along the direction from the first face 4 to the second face 5 perpendicular to the faces 4, 5. The locking member 3 is biased by a spring 8 acting between a plate 9 fixed relative to the body and the locking member 3, which tends to bias the locking member in the direction towards the first face 4. The locking member 3 has two main parts, a groove part 17 and a wedge part 18, and these are held together by screws 14 fastened to holes 14a. Hereby the locking member 3 is given a limited movability.

The locking member 3 has a first end 6 adjacent to the first face and 4 a second end 7 adjacent to the second face 5. The first end 6 protrudes out from the first face 4. It is generally elongate, having an outline of an isosceles trapezium having unequal parallel sides, with the short parallel side of the trapezium closest to the second face 5. The second end 7 is of corresponding shape, having an elongate trapezoidal groove 14 in which the first end 6 can be received. As such, the first end of one spacer 1 can be received within the second end 6 of another spacer (or the corresponding recess in a tool or tool stand as explained below).

Figure 3:
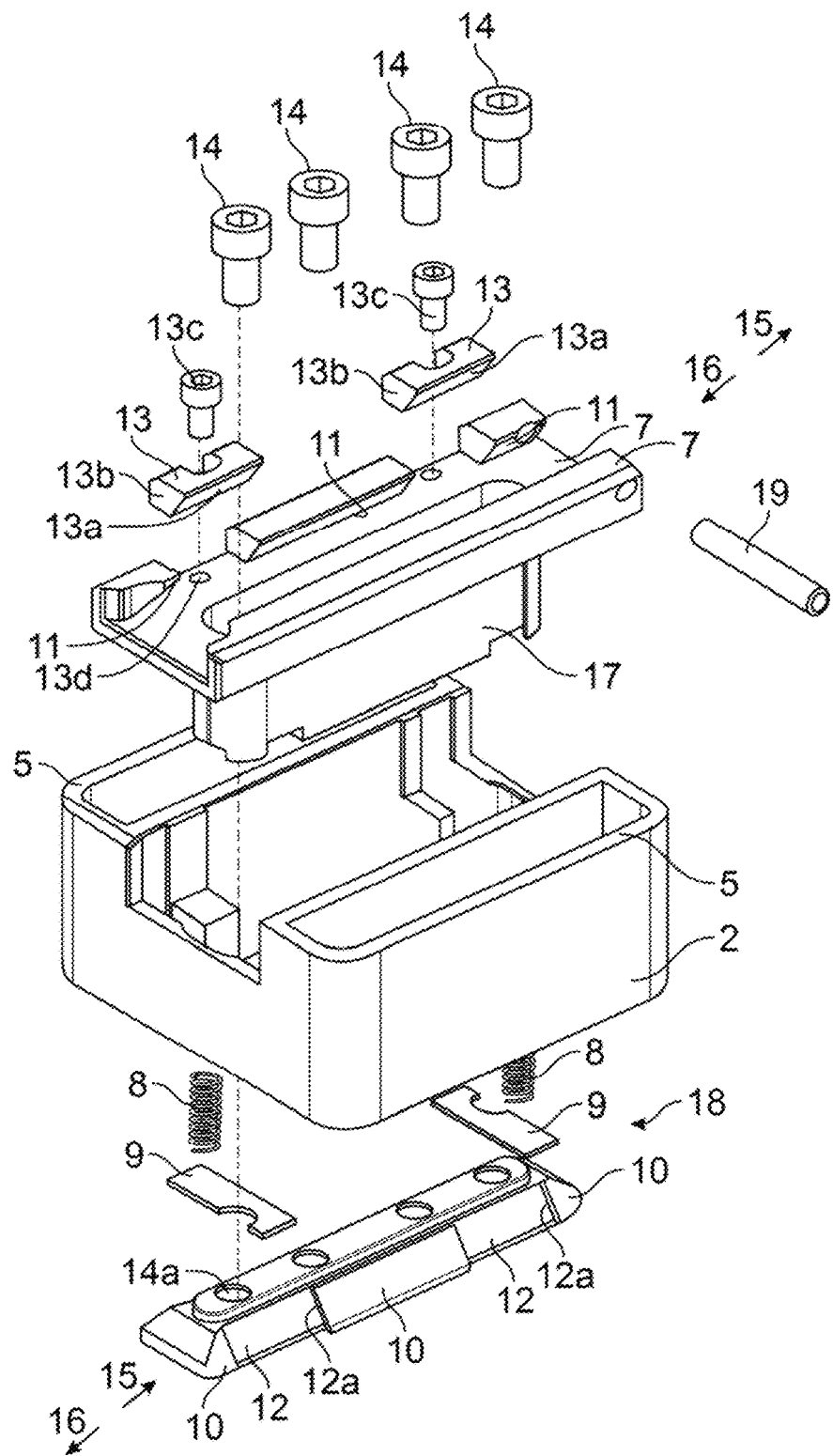
FIG. 3 shows an exploded side perspective view of the spacer of FIG. 1.

In order to control the travel of one spacer 1 relative to the other, there are two mechanisms by which such travel is limited. The first is a pin 19 that blocks the end of the trapezoidal groove and so acts as a stop that will not permit relative movement of the two parts past the pin 19. This stop could prevent the drill motor from falling. However a second stop could also be an advantage to prevent the drill motor from possibly being lifted up by accident from the drill stand. This could be solved by a second easily attachable/detachable stop. Such a stop could e.g. be arranged to block the other end, distant from the pin 19, of the trapezoidal groove. But there is a more elegant solution. The first end 6 could be provided with a set of recesses 12 on its non-parallel sides. The second end has a matching set of tab noses 13a. Once the first part 6 has been slid along the second part 7 to the position where the tab noses 13a overlie the recesses 12, the action of the spring 8 will be to move the locking member 3 so that the tab noses 13a are within the recesses 12. This will restrict further relative movement of the relevant parts in either direction as the tabs 13 will not be able to escape the recesses 12 unless the locking member 3 is manually moved so as to lift the recesses 12 off the tab noses 13a. If there are two stops complementary faces 11, 10 can be completely flat. When the complementary faces are tightened together the spacer will be squeezed against both drill stand and drill motor. But if the faces 11, 10 are not completely flat but are equipped with protruding tab noses 13a and recesses 12 these can meet each other. Each tab nose 13a will have at least one, and preferably two tab edges 13b. When trying to push the spacer along the grove in a direction 15, 16 a tab edge 13b will meet a recess edge 12a and will stop this movement. As shown in FIGS. 1 and 3 the tab nose 13a and tab edge 13b are part of a separate tab 13 fastened with screws 13c in holes 13d. But of course this geometry could instead have been formed from one part through casting or machining.

Figure 4:
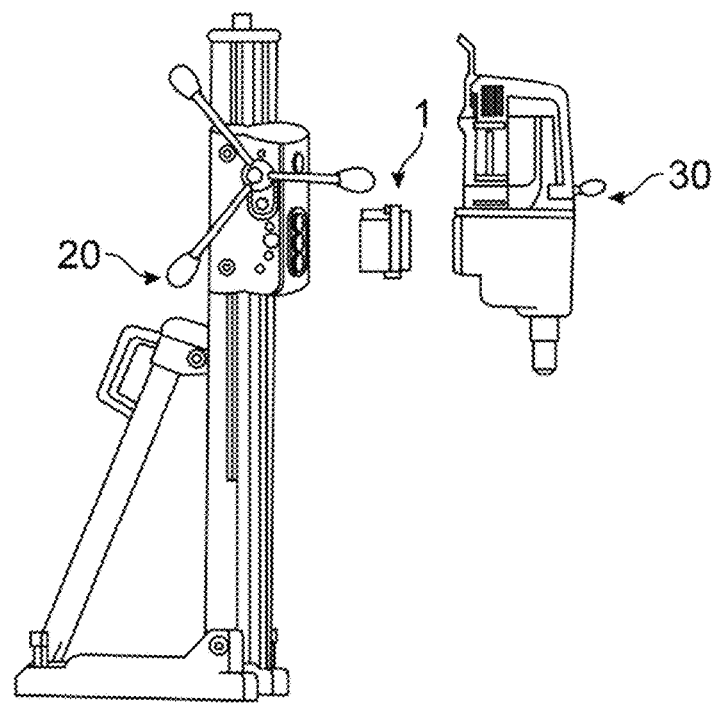
FIG. 4 shows an exploded perspective view of the spacer of FIG. 1 being used with a drill motor and a drill stand.
Figure 5:
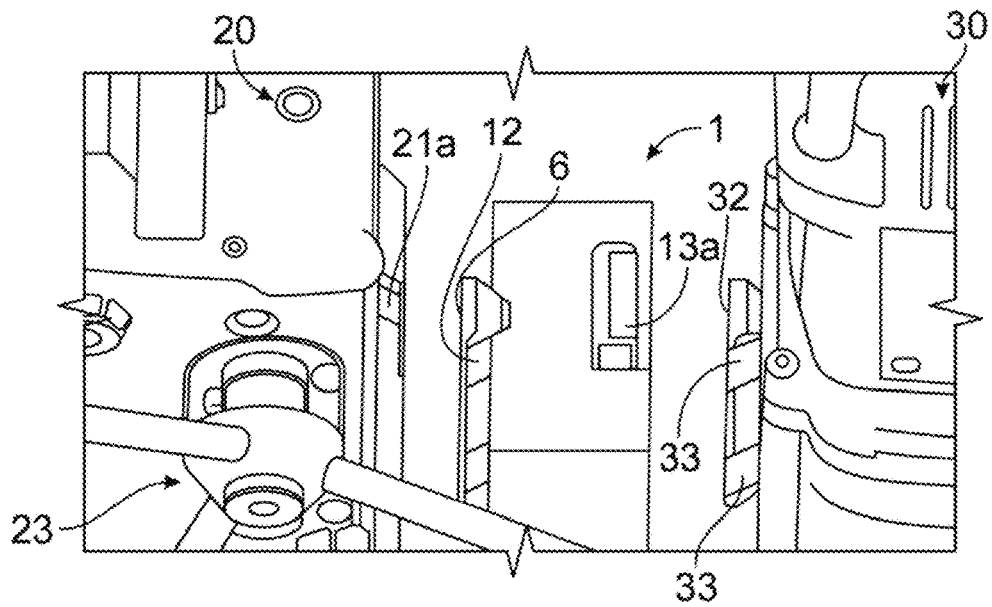
FIG. 5 shows an exploded close up from above of the engagement of the spacer, drill and drill stand of FIG. 4.
Figure 6:
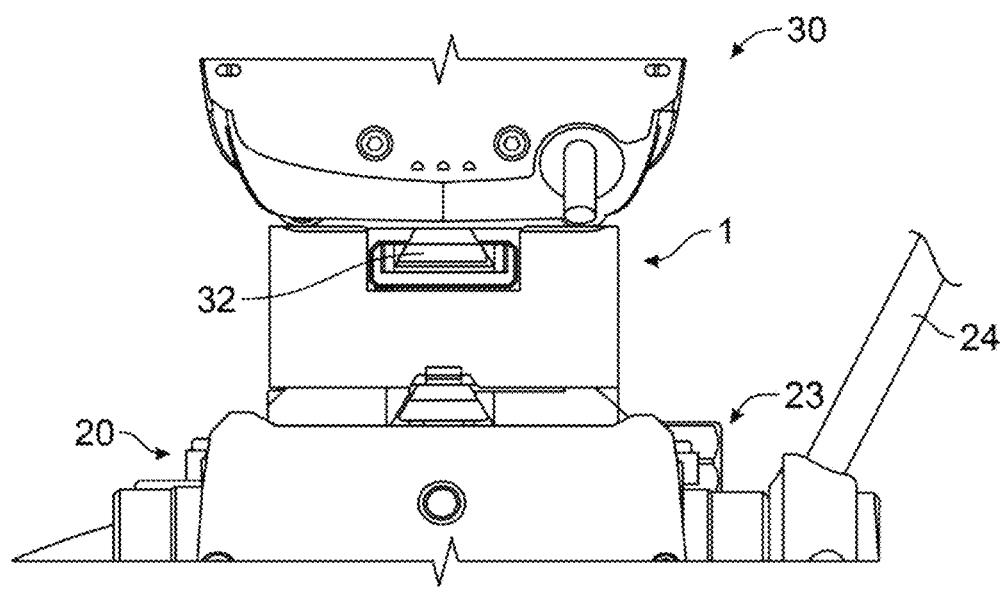
FIG. 6 shows an unexploded close up of the engagement of the spacer, drill and drill stand of FIG. 4.

The use of this spacer can be demonstrated with respect to FIGS. 4 to 6 of the accompanying drawings. In these Figures, the spacer 1 is used to space a drill 30 from a drill stand 20.

The drill motor 30 is provided with a trapezoidal tongue 32, which is complementary to the groove of the spacer 1. The tongue 32 has recesses 33 which match the tab noses 13a on the second end 7 of the spacer, which means that when the tongue 32 is run through the groove of the spacer 1, the tab noses 13a will engage the recesses 33, temporarily holding the spacer 1 relative to the drill motor.

The drill stand 20 is provided with a trapezoidal groove in which the first end 6 can be received. Its groove has similar tab noses 21a as the second end, and so by sliding the spacer 1 relative to the drill stand 20, the tab noses 21a will engage the recesses 12 on the first end 6, with the spring/s 8 causing the recesses 12 to surround the tab noses 21a. This can temporarily hold the drill motor 30 with spacer 1 relative to the drill stand 20.

Once the drill motor 30, spacer 1 and drill stand 20 have been temporarily held in place, it is necessary to lock them together in place. As such, the tab noses 21a of the drill stand can be driven perpendicularly into the recesses 12 of the spacer using locking mechanism 23. This is best done by moving a wheel 24 to the grip 23 and tighten. Thereby the spacer 1 will be tightened towards the drill stand 20 and the drill motor 30 will be tightened against the spacer 1.

When the tab noses 21a are so driven, they will come into contact with the recess 12. Because the tab noses 21a and the locking surface 10 of the recesses 12 each form part of the non-parallel sides of their respective trapezoidal profiles, the exertion of a locking force by the locking surface formed by the face of the tab noses 21a on the locking surfaces 10 will drive the first end 6 away from the first face 4 in towards the drill stand 20, driving the locking member along its permitted direction of movement.

This will, in turn, cause the second end 7 to move towards the first face 4, exerting a force on the locking surfaces of the recesses 33 in the tongue 32.

As such, a single locking mechanism 23 can lock the drill stand 20 to the spacer 1 and the spacer 1 to the drill motor 30.

Figure 7:
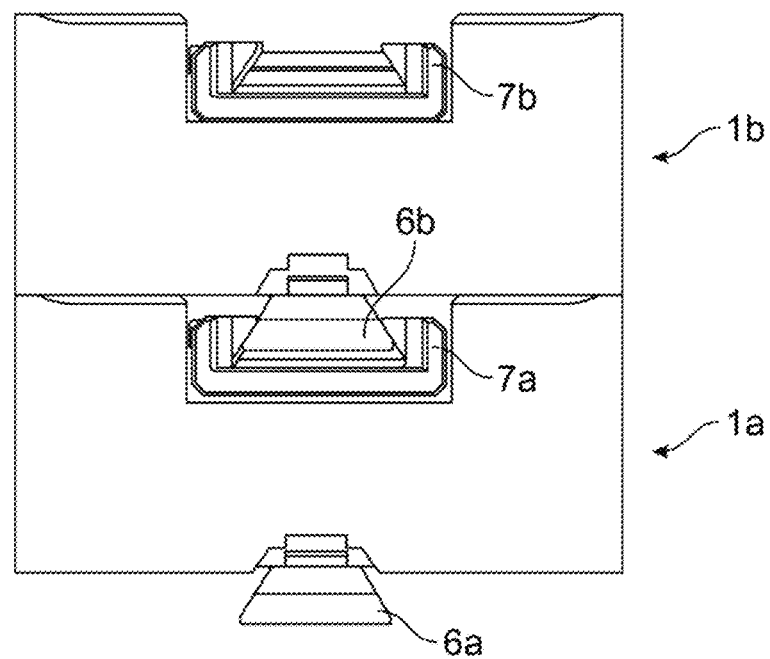
FIG. 7 shows a plan view of a stack of the spacers of FIG. 1.

If it is desired to further space the drill 30 from the drill stand 20, multiple spacers 1a, 1b can be connected in series as shown in FIG. 7 of the accompanying drawings. The first end 6b of one spacer 1b will be received within the second end 7a of the next spacer 1a. When connected between a suitable drill stand 20 and drill motor 20, the locking force exerted by the tabs 21 will still be transmitted through the locking members 3 to the tongue 32, locking all of the members together. If the at least two spacers each have a different height, i.e. a different distance between the first face 4 and the second face 5, many different spacings can be achieved. If one or two spacers are used and each having a height of 50 mm and 75 mm, many different spacings can be achieved like: 50, 75, 100, 125, 150 mm.

The invention claimed is:

1. A spacer for spacing a tool from a tool stand, the spacer comprising a spacer body and a locking member, the spacer body having first and second opposing faces, the locking member extending from a first end thereof adjacent to the first face to a second end thereof adjacent to the second face, the locking member being configured to slide relative to the spacer body along a direction from the first end to the second end when the tool and the tool stand are in an attached state, the first end and the second end each being provided with at least one locking surface, wherein the spacer is arranged such that at application of a locking force each locking surface of one of the first and second ends transmits the locking force to each locking surface of the other of the first and second ends.

2. The spacer of claim 1, wherein each of the locking surfaces is elongate so as to have a length in a direction non-parallel to the direction from the first end to the second end.

3. The spacer of claim 1, wherein the first and second ends are complementary, such that the first end of one spacer can receive or be received within the second end of another spacer by running over one another along their lengths in a lengthwise direction.

4. A spacer for spacing a tool from a tool stand, the spacer comprising a spacer body and a locking member, the spacer body having first and second opposing faces, the locking member extending from a first end thereof adjacent to the first face to a second end thereof adjacent to the second face, the locking member being able to slide relative to the spacer body along a direction from the first end to the second end, the first end and the second end each being provided with at least one locking surface, wherein the spacer is arranged such that at application of a locking force each locking surface of one of the first and second ends transmits the locking force to each locking surface of the other of the first and second ends, wherein the first and second ends are complementary, such that the first end of one spacer can receive or be received within the second end of another spacer by running over one another along their lengths in a lengthwise direction, and wherein the first and second ends each have at least one corresponding tab nose and recess along their lengths, such that as the first and second ends are run over one another along their lengths, each corresponding tab nose and recess engaging one another at a given relative position of the locking surfaces.

5. The spacer of claim 4, wherein the at least one corresponding tab nose has at least one tab edge and the at least one recess has at least one recess edge, such that when the tab nose and the recess engage one another a sliding motion in at least one lengthwise direction is prohibited by at least one tab edge meeting one recess edge.

6. The spacer of claim 4, wherein the spacer comprises at least one biasing member, which acts to bias the locking member relative to the spacer body, so as to bias the at least one tab nose and recess into engagement once the relative position is reached.

7. The spacer of claim 3, wherein one of the first and second ends is provided with a stop, which prevents movement of the first and seconds ends relative to one another past the stop.

8. The spacer of claim 1, wherein the tool stand extends along a direction substantially parallel to a direction of extension of the locking member and the direction from the first end to the second end along which the locking member slides relative to the spacer body.

* * * * *